United States Patent [19]

Brown et al.

[11] 3,867,088

[45] Feb. 18, 1975

[54] APPARATUS FOR FABRICATING A HOLLOW ARTICLE

[75] Inventors: Gaylord W. Brown; George L. Pickard, both of Beaverton, Mich.

[73] Assignee: Koehring Company, Milwaukee, Wis.

[22] Filed: Mar. 16, 1973

[21] Appl. No.: 342,094

Related U.S. Application Data

[63] Continuation-in-part of Ser. No. 268,883, July 3, 1972, Pat. No. 3,787,158.

[52] U.S. Cl.............. 425/504, 425/156, 425/388, 425/397, 425/451, 425/DIG. 48
[51] Int. Cl. ................ B29c 17/04, B29c 27/12
[58] Field of Search........ 425/395, 388, 405 R, 109, 425/451, 413, 437, DIG. 48, 397

[56] References Cited
UNITED STATES PATENTS

| 3,398,434 | 8/1968 | Alesi, Jr. et al. | 425/109 |
|---|---|---|---|
| 3,467,056 | 9/1969 | Mills | 425/109 X |
| 3,470,051 | 9/1969 | Meyer | 425/109 X |
| 3,503,828 | 3/1970 | Walter | 425/109 X |
| 3,537,138 | 11/1970 | Brown et al. | 425/388 X |
| 3,583,036 | 6/1971 | Brown | 425/388 X |
| 3,695,799 | 10/1972 | Held, Jr. | 425/388 X |
| 3,709,967 | 1/1973 | Held, Jr. | 425/388 X |
| 3,779,687 | 12/1973 | Alesi | 425/388 X |

*Primary Examiner*—Robert L. Spicer, Jr.
*Attorney, Agent, or Firm*—Learman & McCulloch

[57] ABSTRACT

Methods and apparatus for fabricating a hollow article from sheets of juxtaposed, deformable, thermoplastic material wherein mold apparatus is provided for thermoforming a shape in at least one of the sheets. In one aspect of the invention, apparatus is provided for depositing a reinforcing member on one of the sheets, and the sheets are then fused together to sandwich the reinforcing member between the sheets. The reinforcing member may move a portion of one of the sheets into a mold cavity before it is released. In another aspect of the invention, a plug assist member is moved to a position between a pair of molds and is then swung into a cavity in one of the molds to assist in moving a portion of a plastic sheet into the mold cavity. The plug assist member is then removed and the molds are brought together to fuse the edge of the sheets.

14 Claims, 30 Drawing Figures

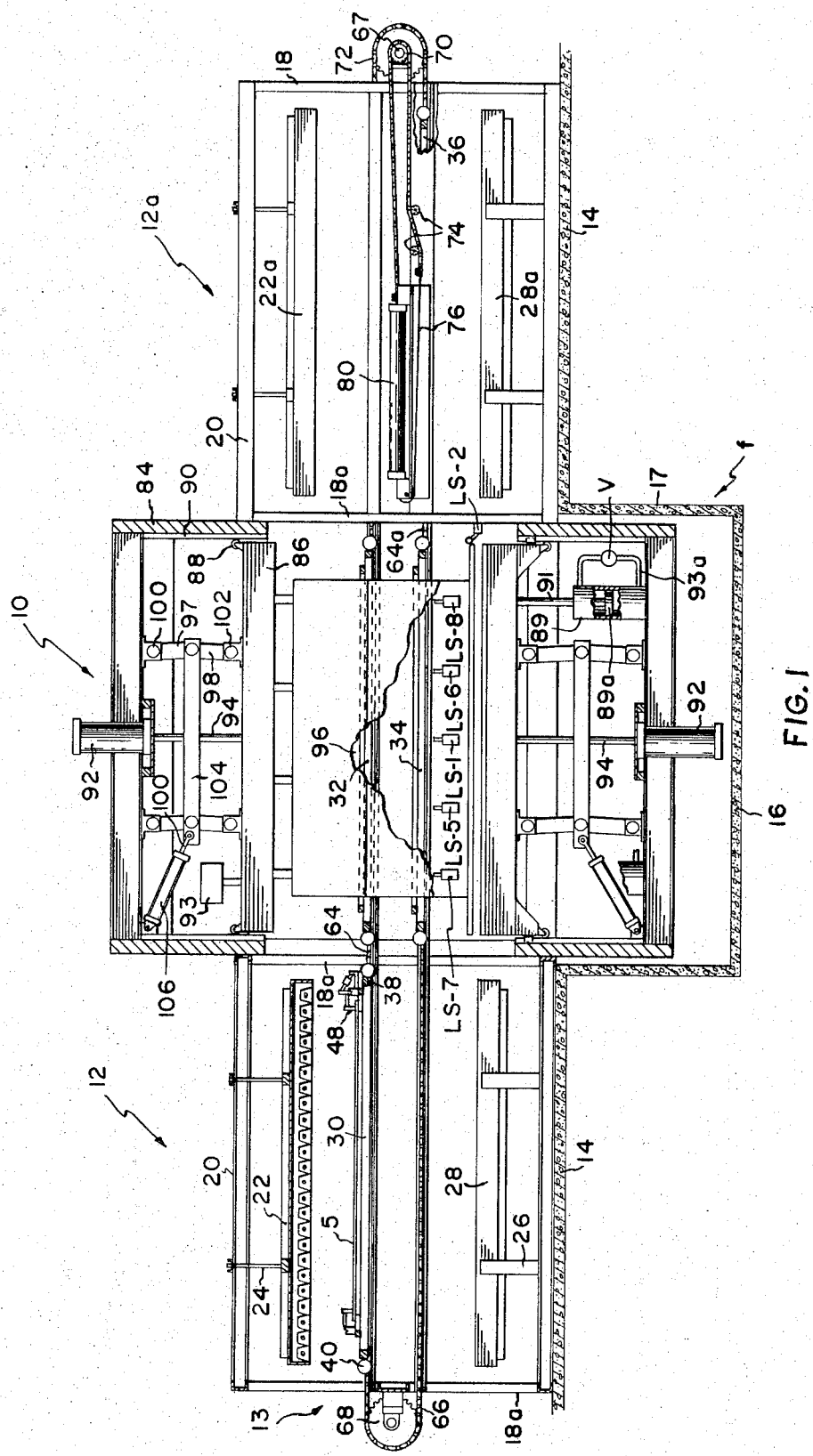

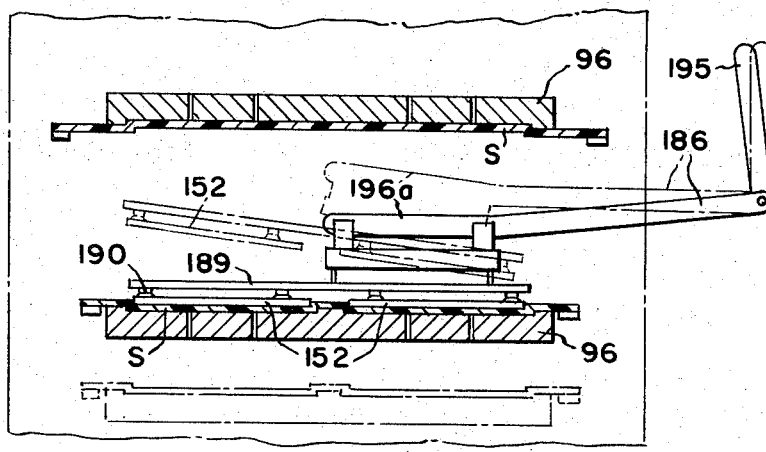
FIG. 7
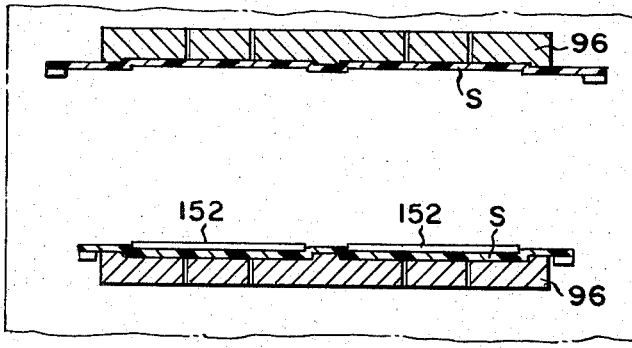 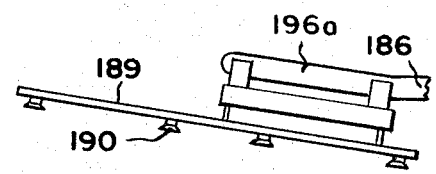
FIG. 8
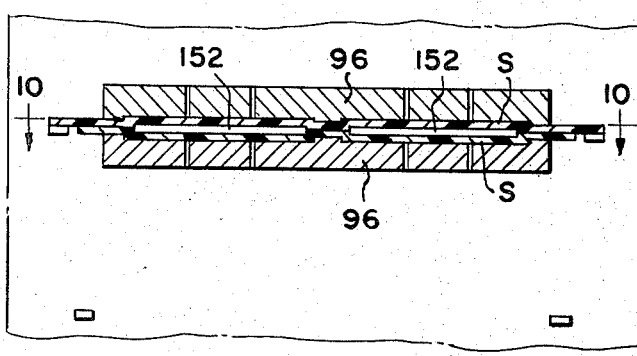
FIG. 9

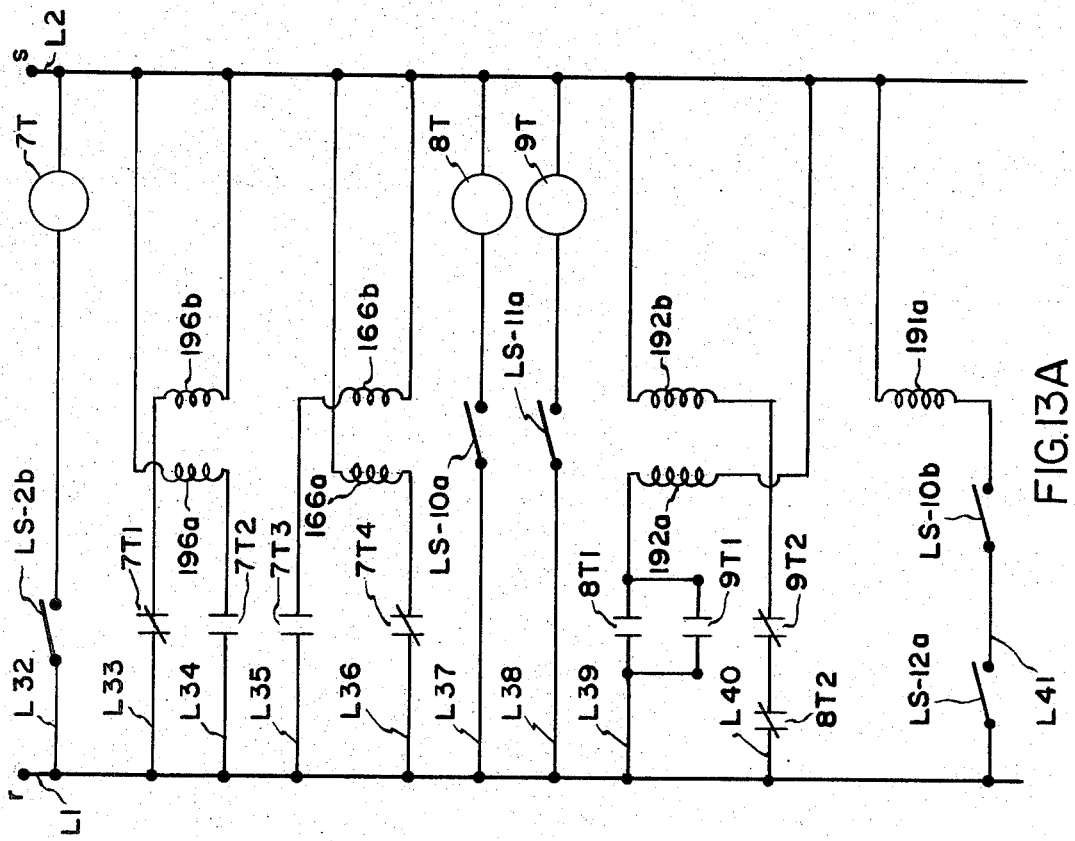
FIG.13A
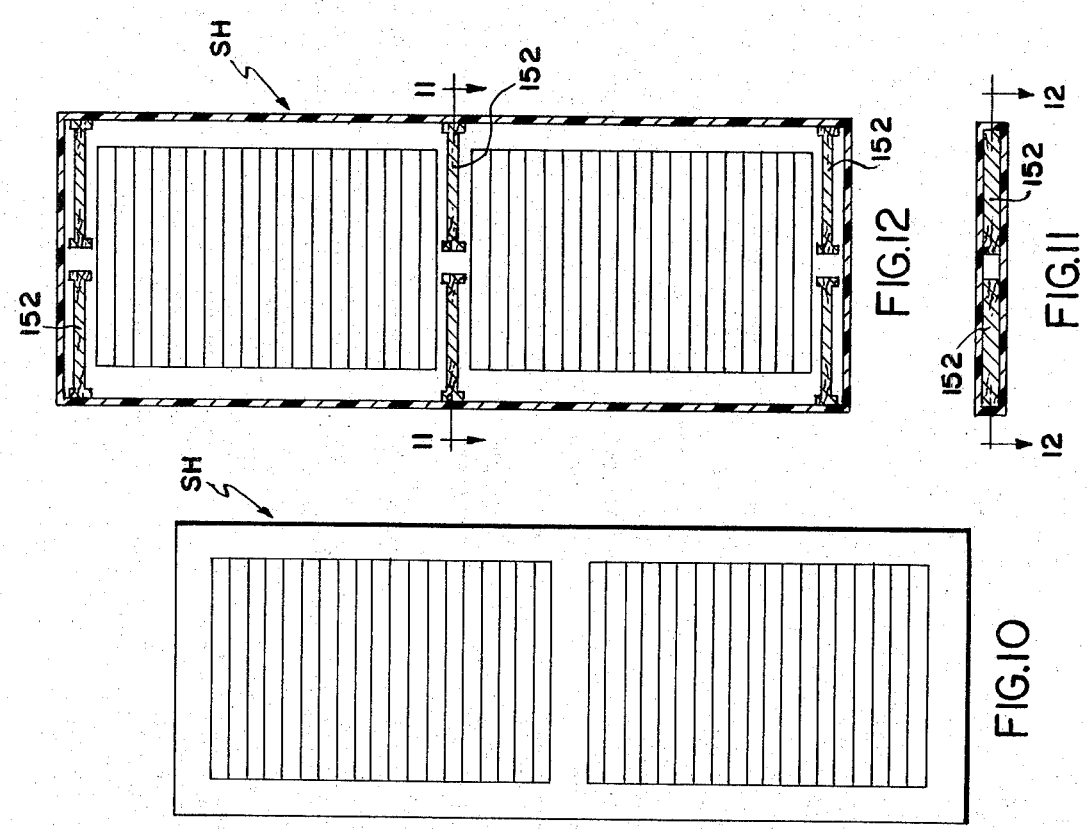
FIG.12
FIG.11
FIG.10

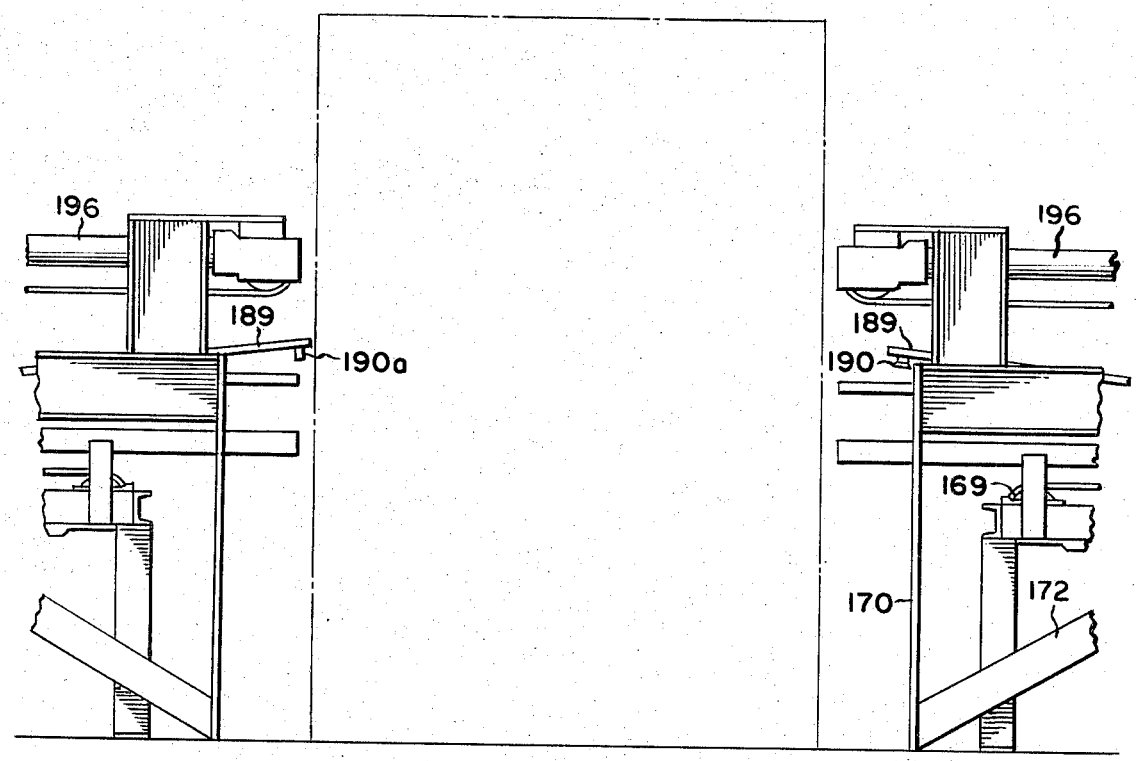
FIG.17
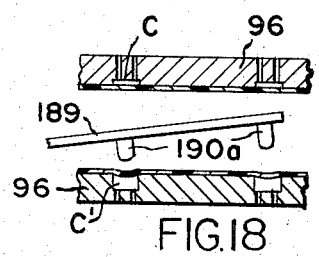
FIG.18
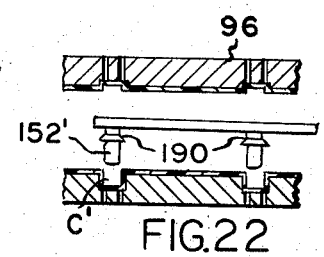
FIG.22
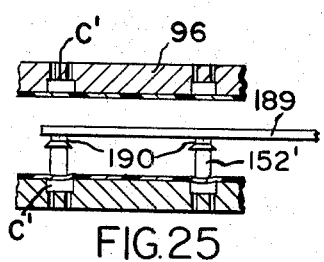
FIG.25
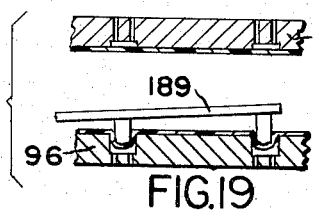
FIG.19
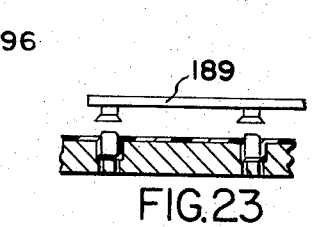
FIG.23
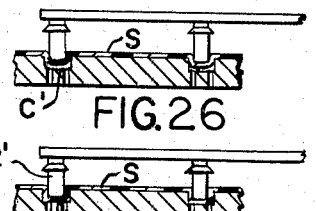
FIG.26
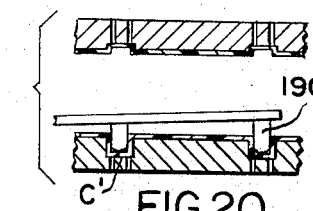
FIG.20
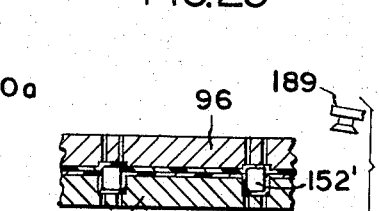
FIG.24
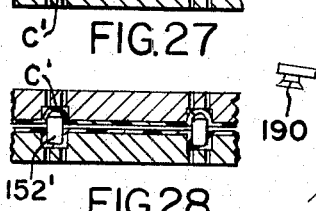
FIG.27
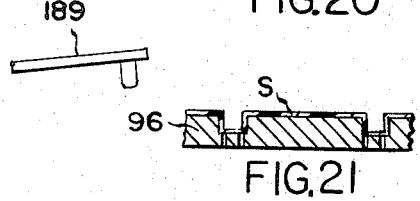
FIG.21
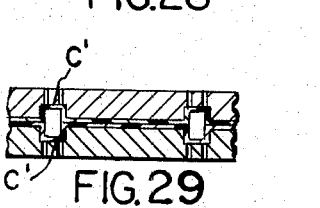
FIG.28
FIG.29

APPARATUS FOR FABRICATING A HOLLOW ARTICLE

This is a continuation-in-part application of the present assignee's copending patent application Ser. No. 268,883, now U.S. Pat. No. 3,787,158, filed in the United States Patent Office on July 3, 1972.

BACKGROUND OF THE INVENTION

This invention relates to apparatus for, and a method of, fabricating a hollow article from a pair of deformable plastic sheets, and more particularly to apparatus incorporating mold station entering means which is movable to a position between the molds before the molds are brought together to fuse the sheets.

Hollow articles, formed by twin sheet thermoforming apparatus such as that disclosed in the aforementioned patent application are structurally sounder, if they are internally reinforced. Accordingly, it is an object of the present invention to provide twin-sheet thermoforming apparatus and methods of the type described, particularly for large area articles, which deposit a reinforcing member on one of a pair of sheets utilized to form a hollow object.

It is another object of the present invention to provide twin-sheet thermoforming apparatus of the type described which includes a horizontally movable carriage mounting a reinforcing member carrier that is horizontally movable therewith to carry a reinforcing member between upper and lower sheets, and then vertically movable relative thereto to deposit it on the formed lower sheet.

It is a further object of the present invention to provide twin-sheet thermoforming apparatus of the type described which includes a reinforcing member supply carriage and a reinforcing member gripper support carriage which removes reinforcing members from the supply carriage and deposits them on one of a pair of sheets of plastic to be molded into a hollow object.

Deep-draw machines for forming objects in single sheets of plastic generally utilize plug assist members on one of a pair of opposed molds to aid the vacuum condition in the female cavities of the other mold to move portions of the plastic sheets into the female cavities. In forming articles from juxtaposed sheets of plastic, the opposed molds frequently are provided with confronting female cavities and do not include male plug assist members for assisting movement of the sheets toward the other mold. Accordingly, it is another object of the present invention to provide twin-sheet thermoforming apparatus for fabricating an object from a pair of juxtaposed sheets of thermoplastic material, including plug assist members movable to and from an operative position in which the plug assist members are received in the cavity in one of the molds prior to the sheets being fused together.

Yet another object is to provide twin-sheet thermoforming apparatus of the type described including a plug assist carrier, movable in a to-and-fro path of travel to and from a position between the mold members, mounting at least one plug assist member for transverse movement, to and from a cavity in one of the molds when the carrier is between the mold to aid the movement of a portion of a sheet into the cavity.

Another object of the invention is to provide apparatus of the type described wherein the reinforcing member functions as a plug assist member.

Other objects and advantages of the present invention will become apparent to those of ordinary skill in the art as the description thereof proceeds.

SUMMARY OF THE INVENTION

The present invention relates to twin sheet thermoforming apparatus wherein a generally horizontally moving carriage is moved between a pair of mold members at the forming station and a reinforcing member or members carried thereby is or are released to one of the plastic sheets. During the same operation or alternately plug assists carried by a similar carriage may be used to assist in the forming operation and withdraw.

The present invention may more readily be understood by reference to the accompanying drawings in which:

FIG. 1 is a partly sectional, side elevational view, of fabricating apparatus including heating stations on opposite sides of thermoforming apparatus at a central forming station, part of the thermoforming apparatus at the forming station being broken away to more clearly illustrate a pair of sheet-supporting carriages positioned in superposed relation, and part of the side wall of one of the heating stations being broken away to more clearly illustrate the carriage supported thereat;

FIGS. 7 – 9 illustrate various sequential positions of the apparatus illustrated in FIGS. 5 and 6;

FIG. 10 is an enlarged, top plan view of a plastic shutter formed with apparatus constructed according to the present invention taken along the line 10—10 of FIG. 9;

FIG. 11 is a sectional end view of the shutter illustrated in FIG. 1, taken along the line 11—11 of FIG. 12;

FIG. 12 is a sectional plan view of the shutter, taken along the lines 12—12 of FIG. 11;

Figure 3:
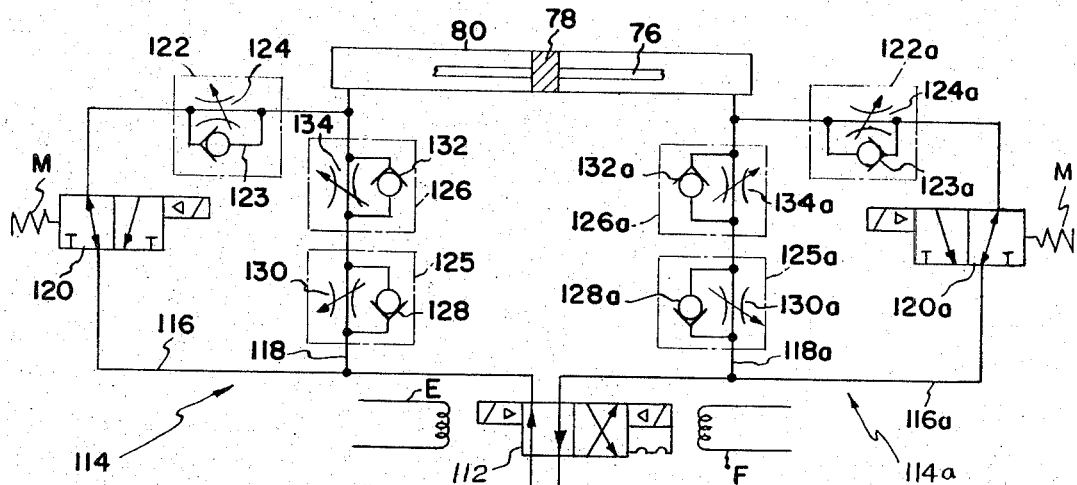
FIG. 3 is a schematic diagram of a fluid control circuit for operating the fabricating apparatus illustrated in FIGS. 1 and 2.
Figure 4:
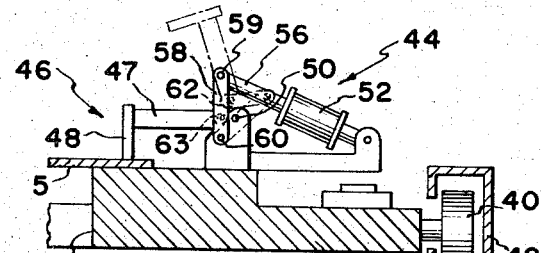
FIG. 4 is a sectional end view taken along the line 4—4 of FIG. 1 illustrating one of the plastic sheet clamping members.
Figure 5:
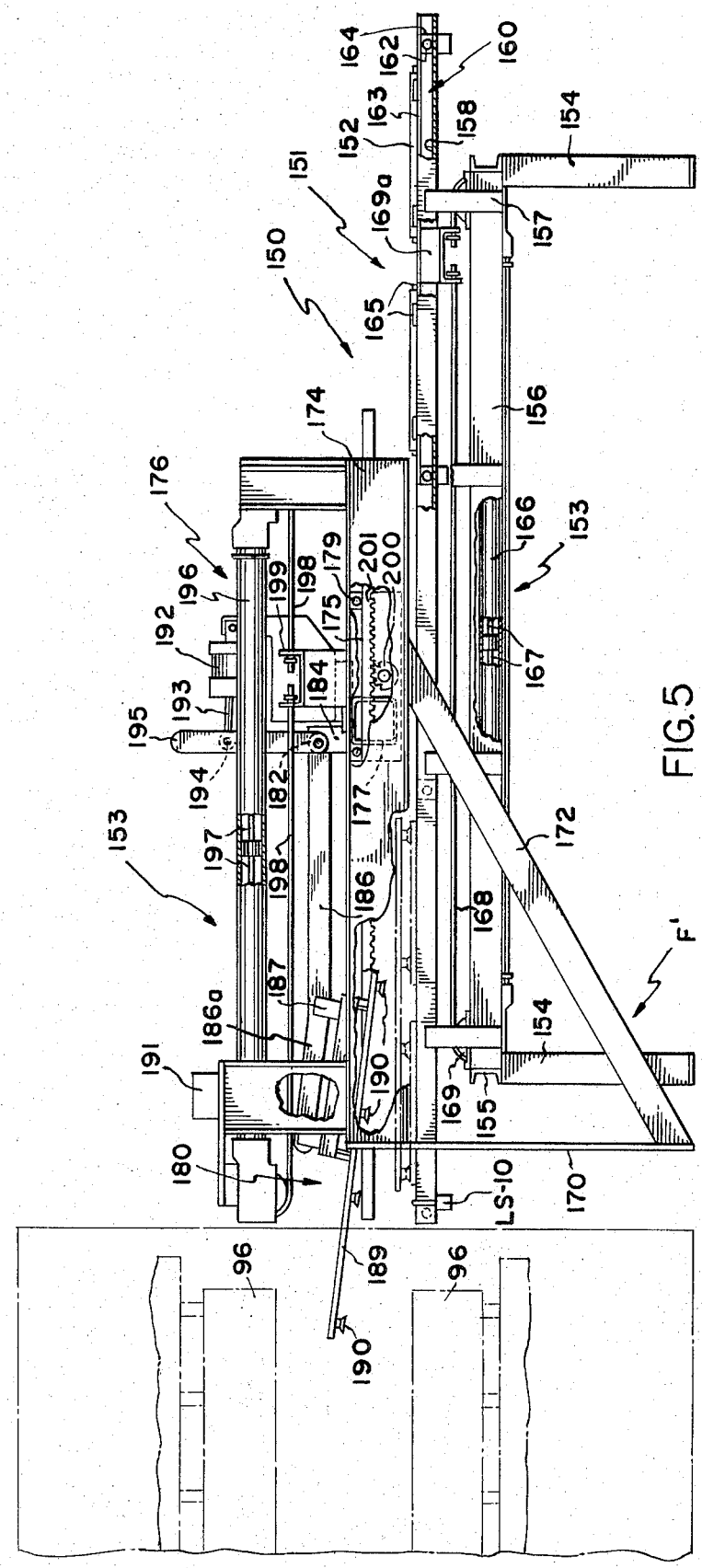
FIG. 5 is an end elevational view, taken along the line 5—5 of FIG. 1, particularly illustrating apparatus for inserting reinforcing members between the sheets, parts of the apparatus being omitted for purposes of clarity.
Figure 6:
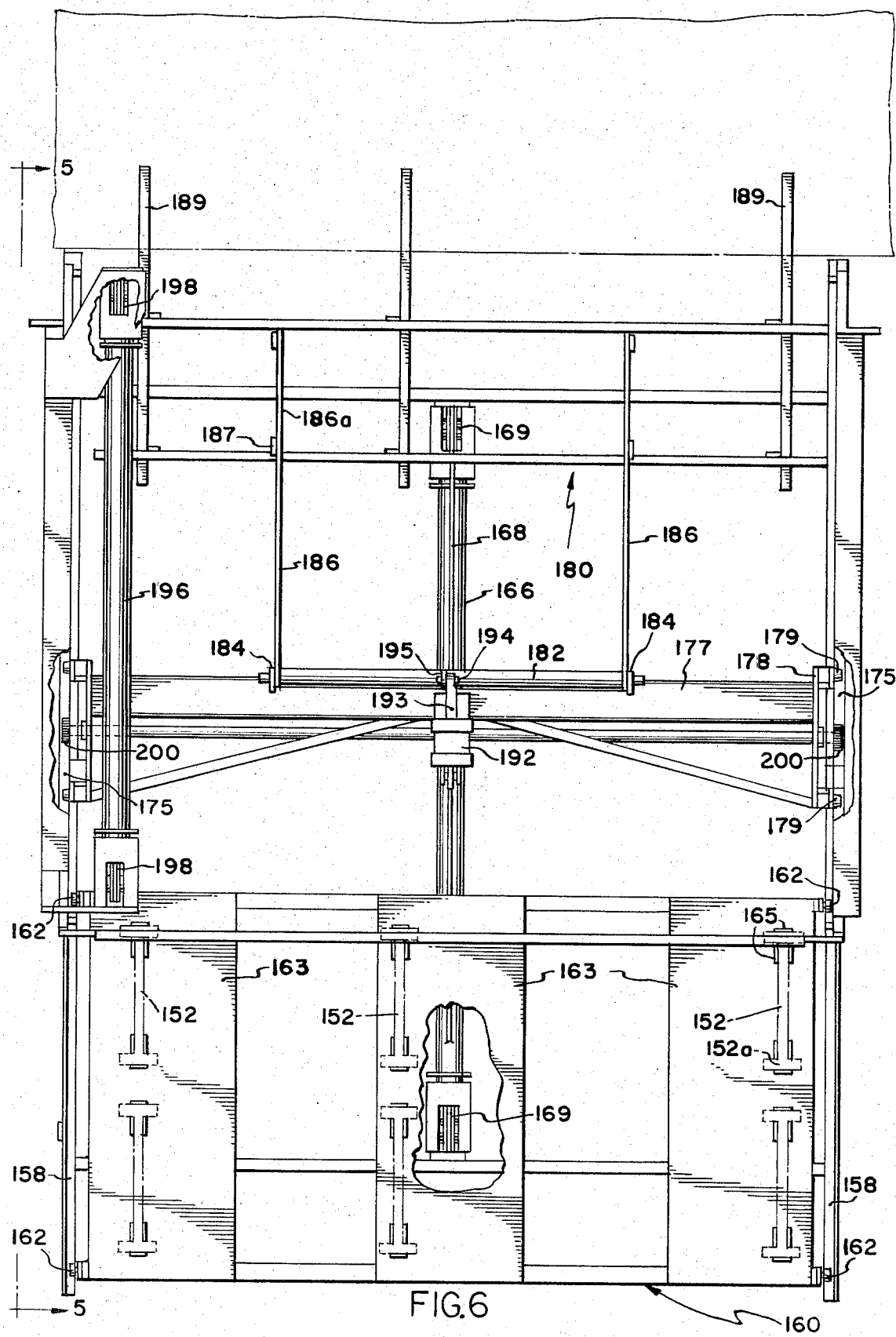
FIG. 6 is a top plan view of the apparatus illustrated in FIG. 5, taken along the line 6—6 of FIG. 5.
Figure 13:
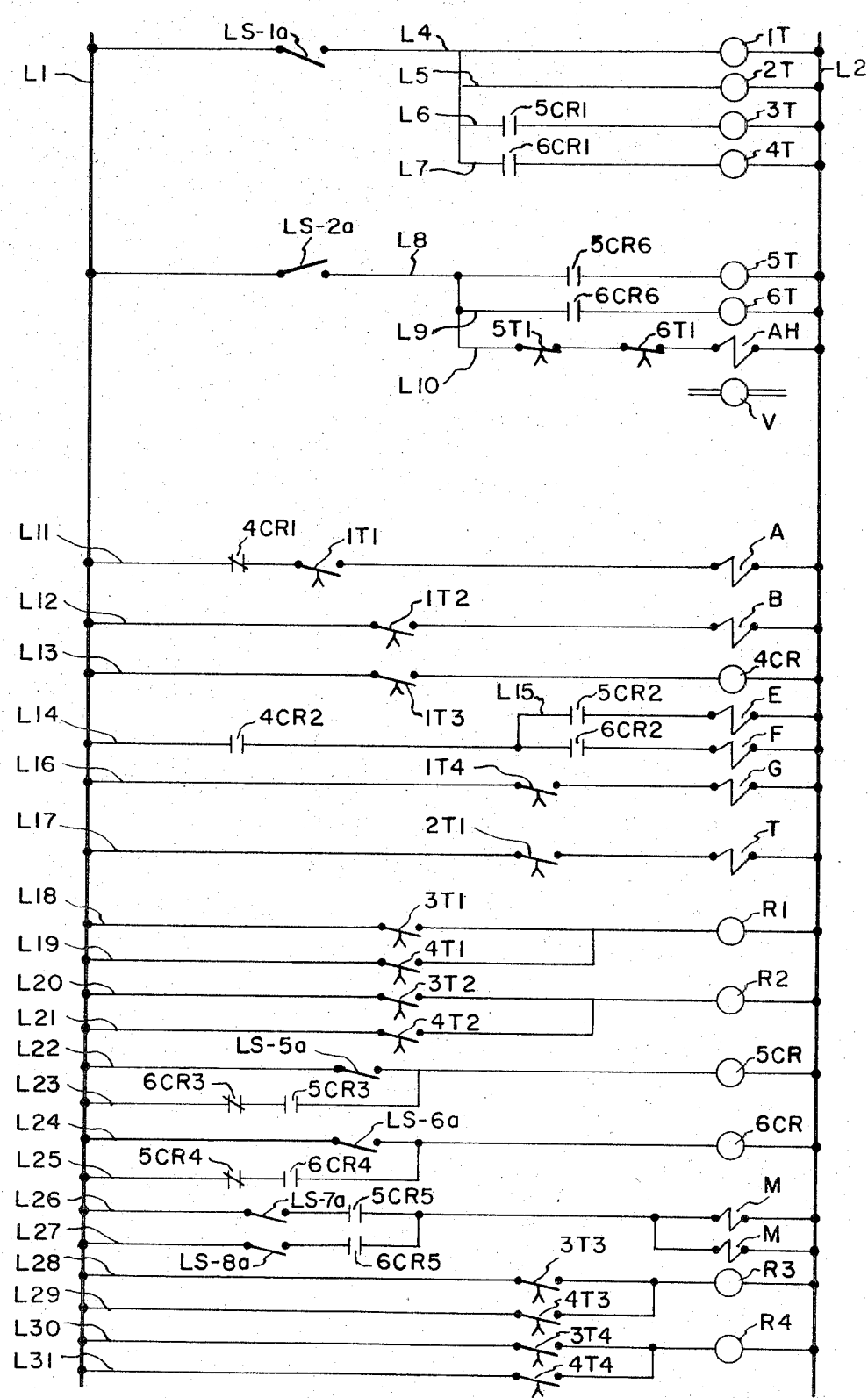
Figure 14:
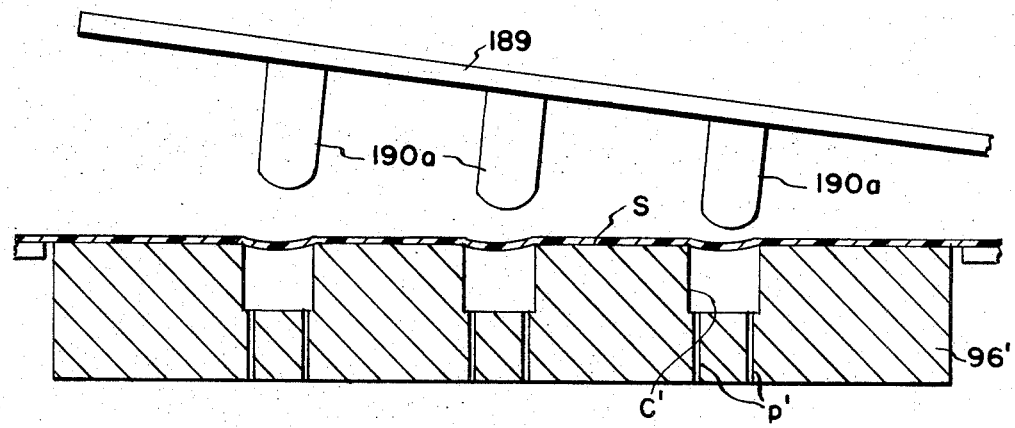
Figure 15:
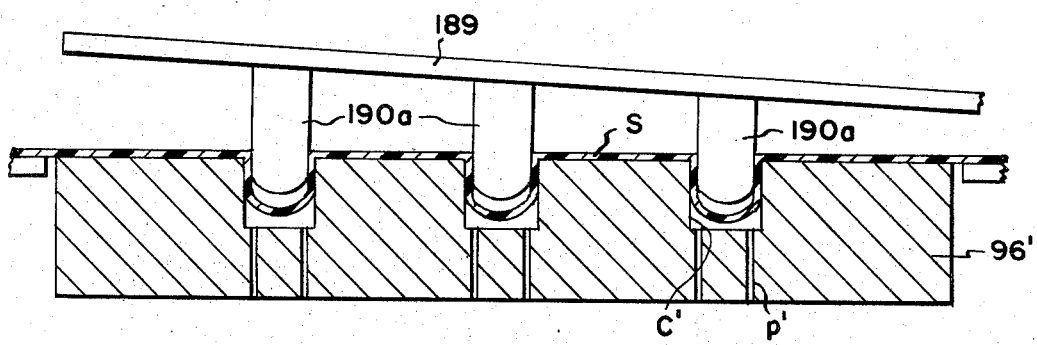
Figure 16:
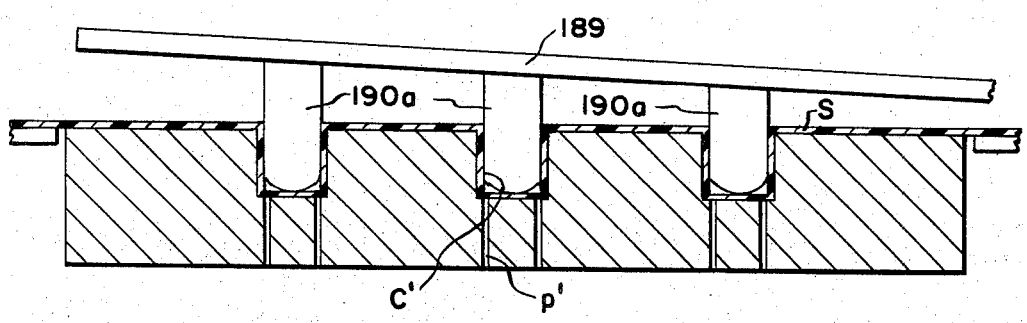

FIGS. 13 and 13A together comprise a schematic diagram of an electrical control circuit utilized to control the apparatus illustrated in FIGS. 1 - 7;

FIGS. 14 – 16 are enlarged, opposite end elevational views illustrating various sequential positions of deep draw plug assist members used with the machinery;

FIG. 7 is a slightly reduced opposite end elevational view of apparatus for inserting reinforcing members between the sheets and opposed apparatus including deep draw plug assist members, sequentially movable to operative positions between the spread molds;

FIGS. 18 – 24 are end views, similar to FIG. 17, illustrating various sequential positions of the apparatus illustrated in FIG. 17; and FIGS. 25 – 29 are end views, similar to FIG. 5, illustrating the apparatus of FIGS. 1 – 7 utilized to deep draw a part.

DESCRIPTION OF THE PREFERRED EMBODIMENT

Fabricating apparatus constructed according to the invention is mounted on a support frame f and includes a pair of plastic sheet heating stations, generally designated 12 and 12a, on opposite sides of a central forming station 10, and a sheet advancing assembly, generally designated 13, for moving plastic sheets S between the heating and forming stations. The frame f includes a pair of bottom support wall portions 14 at the heating stations 12 and 12a connected to a central, bottom wall portion 16 by vertical support legs 17 and supporting vertical, end and side rails 18 and 18a spanned by upper and lower rails 20 at each of the heating stations 12 and 12a.

Suspended on pairs of frame suspension members 24 depending from the top rails 20 at the heating station 12 is a quartz lamp heater 22 which may be of the conventional type manufactured by E. L. Weigand Company of N.J. or General Electric Company. Supported on the lower rails 20 at the heating station 12 is an identical quartz lamp heater 28.

The apparatus at the heating station 12a is identical to the apparatus at the heating station 12 and corresponding parts are identified by corresponding reference characters followed by an a subscript.

THE SHEET ADVANCING ASSEMBLY

The sheet advancing assembly 13 includes a pair of upper, plastic sheet supporting carriage members 30 and 32 and a pair of lower plastic sheet supporting carriage members 34 and 36 each including a rectangular frame 38 (FIG. 4) having side caster rollers 40 rotatably received in frame supported, vertically spaced, horizontal, channel members 42 extending the length of the machine. The hollow rectangular frame 38 includes a plastic sheet receiving opening 37 therein and mounts a plurality of sheet clamping assemblies 44 each including a clamp 46 having a sheet engaging member 48 supported on a clamp arm 47 pivotally mounted on a carriage supported pin 50.

The upper and lower sheet supporting carriage frames 38 are identical except that the dimensions of the openings 37 in the lower frames 38 are less than the dimensions of the openings 37 in the upper frames 38 to permit the unrestricted upward movement of the lower sheets S to the sheets S on the upper carriages during the forming operation, as will be described more fully hereinafter.

Apparatus is provided for swinging each clamp 46 between the clamping position, illustrated in solid lines in FIG. 4 and the unclamped position, illustrated in chain lines in FIG. 4, and comprises a fluid pressure operated cylinder 52 pivotally mounted on a carriage supported pivot pin 54 and including a piston rod 56 pivotally connected to a pair of laterally spaced links 58 by a pivot pin 59. The links 58 are pivotally mounted on the carriage 38 by pivot pins 60. Depending from the pivot pin 59 is a support link, illustrated in chain lines at 62, pivotally connected by a pin 63 to the clamp arm 47 for moving the clamp arm 47 to the unclamped position, illustrated in chain lines in FIG. 4, when the piston rod 56 of the cylinder 52 is retracted.

The upper sheet supporting carriages 30 and 32 are coupled to each other for concurrent movement by coupling chains 64 and the lower sheet supporting carriages 34 and 36 are coupled together by coupling chains 62a. The upper and lower sheet supporting frames 30 and 34 and the upper and lower frames 32 and 36 are coupled together by roller chains 66 trained around sprocket wheels 68 fixed to shafts 67 journaled at opposite ends of the frame f.

A drive sprocket 70 is mounted on one of the shafts 67 and a drive chain member 72, traveling over frame supported idler sprocket wheels 74 is trained therearound. Coupling members 75 (FIG. 2) couple opposite ends of the chain 72 to cables 76 connected to opposite ends of a piston 78 slidingly disposed within a fluid operated cylinder 80 supported on the frame f. A fluid control system, illustrated in FIGS. 2 and 3, and to be described hereinafter, is provided for longitudinally moving the piston 78 in the cylinder 80 to drive the chains 72 so as to move the carriages 30 and 32 from the positions illustrated in FIG. 1 to positions in which the carriage 30 is at the forming station 10 and the carriage 32 is at the heating station 12a while concurrently moving the sheet supporting carriage 36 to the forming station 10 and the carriage 34 to the heating station 12.

THE MOLD OPERATING MECHANISM

The central forming station 10, disposed between the heating stations 12 and 12a, includes forming apparatus mounted on vertically spaced top and bottom mounting rails 82 spanning vertical support plates 84 which are supported by the vertical side frame rails 18a.

Mounted on the top and bottom rails 82 for vertical movement between the adjacent molding positions, illustrated in FIG. 1, and vertically spaced positions are upper and lower mold supporting platens 86 mounting guide rollers 88 which ride on guides 90 fixed to the vertical support plates 84. The mold supporting platens are vertically reciprocated by fluid pressure actuated cylinders 92 supoorted on the top and bottom rails 82, including piston rods 94 fixed to the platens 86. The platens 86 support upper and lower differential pressure molds 96 including confronting mold cavities C (FIG. 7) in which upper and lower half sections or shapes h of an object are formed and fused together at their edges when the molds 96 are moved together, as will be described more particularly hereinafter. The cylinders 92 are firstly operated to move the molds 96 into engagement with the upper and lower heated plastic sheets S at the forming station 10. Vacuum from a vacuum source 93 is then communicated to the mold cavities C via ports p and the top and bottom mold sections h are formed to the shape of the mold cavities C. The stroke of the upper cylinder 92 is such that the upper mold 96 engages the upper sheet S when the piston rod 94 is at the end of its travel. The piston rod 94 and the stroke of the lower cylinder 92 are longer than the piston rod 94 and the stroke of the upper cylinder 92 respectively so that the lower mold 96 can be moved upwardly through the opening 37 in the lower frame 38 to move the lower sheet, which is first of all released by the clamps 46, upwardly and press the complementary edges of the mold sections 96 together.

Apparatus is provided for removably locking the molds 96 in the adjacent molding positions illustrated in FIG. 1 in engagement with opposite sides of the upper and lower sheets S to fuse the sheets S together and comprises pairs of pivotally connected toggle links 97 and 98 which are pivotally connected, by pins 100 and 102, to the upper and lower frame rails 82 and the upper and lower mold supporting platens 86. A connecting bar 104 is coupled to the toggle links 97 and 98 for concurrently moving the toggle links 97 and 98 to and from substantially dead center positions when a frame supported, solenoid actuated, double acting, fluid pressure operated cylinder 106, having a piston rod 108 connected with the bar 104, is actuated. Such toggle apparatus is more particularly described in applicant's reissue U.S. Pat. No. RE27,137, granted June 8, 1971, which is incorporated herein by reference.

Hydraulically operated platen locking or stop cylinders 89 are provided on the lower rails 82 and include piston rods 91 connected to the lower platen 86 for positively, temporarily interrupting upward movement of the mold 96 after the upper and lower molds are moved into engagement with the upper and lower sheets S. The piston rods 91 are connected to pistons 89a slidably received in cylinders 89. A fluid circuit line 93a connects the opposite ends of the cylinders 89 to permit the free flow of hydraulic fluid therebetween. A solenoid operated valve V is connected to the line 93a to selectively positively interrupt the flow of fluid through the lines 93a. When the upper and lower molds 96 engage the sheets S, a limit switch LS-2, mounted on the frame plate 18 is actuated to energize a solenoid AH (line L10, FIG. 5) to operate the valve V and block the flow of hydraulic fluid in lines 93a to positively interrupt movement of the lower platen 86. The cylinders 89 will override the force of the lower mold actuating cylinder 92 tending to move the lower mold 96 and will positively halt the upward movement of the lower mold. After a short delay time, the solenoid AH (line L10) is deenergized and the lower mold is permitted to continue its upward movement toward the upper mold 96.

FLUID CONTROL CIRCUIT FOR THE SHEET SUPPORTING CARRIAGES

Figure 2:
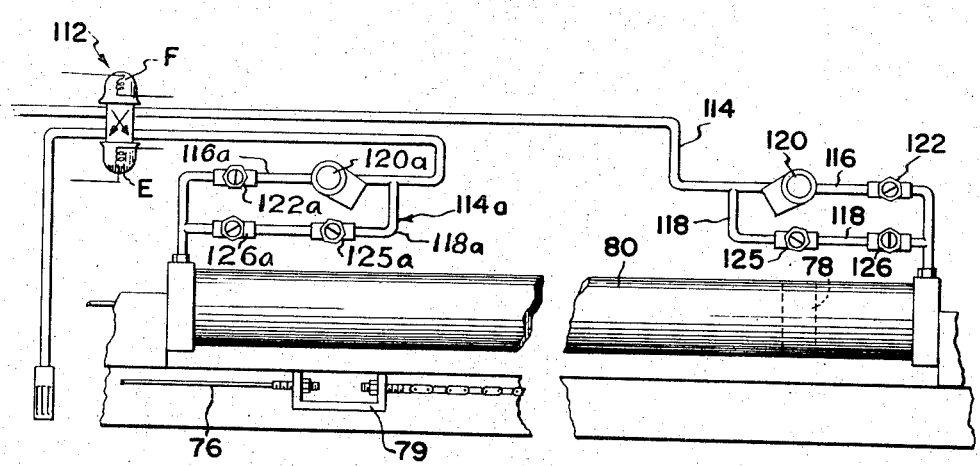
FIG. 2 is an enlarged, side elevational view of indexing apparatus.

Referring now more particularly to FIGS. 2 and 3, air is provided from a reservoir source 110 which typically supplies air at 80 psi, to a solenoid actuated, 2-position, 4-way valve 112, such as MAC valve, Type 323B-1. The output of the valve 112 is connected to a pair of parallel circuits, generally designated 114 and 114a communicating with opposite ends of the carriage indexing cylinder 80. The parallel circuit 114 includes parallel lines 116 and 118. Connected in series in line 116 is a solenoid actuated 2-way, 2-position deceleraton valve 120, selectively movable to "flow-through" and fluid blocking positions, and a variable flow check valve assembly 122 which includes a check valve 123, permitting the free flow of operating air to the carriage indexing cylinder 80, and a parallelly connected variable orifice valve 124 which can adjust the flow of air therethrough.

Connected in series in line 118 are a pair of variable flow check valve assemblies 125 and 126 including oppositely poled check valves 128 and 132, respectively, connected in parallel with the check valves 128 and 132 respectively. The valve assembly 125 permits the free flow of air to the cylinder 80 while restricting the outward flow of air whereas the valve assembly 126 permits air to flow out of the cylinder 80 but restricts the flow of air to the cylinder 80. The circuit 114a is identical to the circuit 114 and identical components will be identified with identical reference characters followed by an *a* subscript.

The directional control valve 112 includes solenoids E and F which are operative, when energized, to move the valve spool of the valve 112 to the "flow-through" position and "cross-over" positions respectively. The deceleration valves 120 and 120a includes solenoids M which, when energized, move the spring returned valve spools to the fluid blocking positions to force fluid through the fluid restricting fluid lines 118 and 118a respectively.

THE APPARATUS FOR INSERTING THE REINFORCING MEMBERS

Apparatus, generally designated 150 (FIG. 5), and extending generally transversely to the longitudinal path of the carriages 30, 32, 34 and 36, is provided for moving flat, reinforcing members 152 (FIG. 12), onto the plastic sheets S supported by the lower carriages 34 and 36 at the central forming station 10. The reinforcing members 152, which are I-shaped in plan, may be cut from wood or other similar material. The reinforcing members 152 may be coated with adhesive, if desired, to improve the bond between the sheets S and the reinforcing members 152. The apparatus 150 includes a sub-frame F' mounting reinforcing member supply apparatus, generally designated 151, and reinforcing member transfer apparatus, generally designated 153.

The sub-frame F' includes upstanding support legs 154 spanned by end rails 156 and side rails 155. Upstanding support posts 157 are provided on the end rails 156 and mount a pair of longitudinally spaced tracks or channels 158 extending the length of the end rails 156. The reinforcing member transfer apparatus 153 includes an insert supply carriage, generally designated 160, having a plurality of longitudinally spaced, generally flat, reinforcing member support plates 163 spanned by rails 164 mounting caster rollers 162 that are received in the tracks 158 for movement between the supply or charging position, illustrated in solid lines in FIG. 5, and the forward, discharging position illustrated in chain lines in FIG. 5. The flat, insert member support plates 163 include a plurality of upstanding, locating fins 165, adapted to receive the end portions 152a of the reinforcing members 152 which lie flat on the plates 163.

Apparatus is provided for moving the reinforcing member supply carriage 160 between the charging and discharging positions and includes a fluid operated, double acting, solenoid actuated cylinder 166 mounted on the sub-frame F'. A pair of pistons 167 extend from opposite ends of the cylinder 166 and connect to the ends 168a of cables 168 trained around pulleys 169 journaled on the sub-frame F'. The other ends of the cables 168 are connected to a bracket 169 depending from the carriage 160. As the cylinder 166 is actuated to move the pistons 167 in opposite directions, the carriage 160 is pushed and pulled thereby in a to-and-fro manner.

The sub-frame F' further includes upstanding posts 170 and vertically inclined posts 172 mounting longitudinally spaced rails 174 having confronting tracks or channels 175 on which the transfer apparatus, generally designated 153, is transversely movable. The transfer apparatus 153 includes a carriage 176 having a longitudinally extending, tubular mounting bar 177 (FIG. 6) spanning end plates 178 having tapered caster rollers 179 received in the tracks 175. The transfer apparatus 153 includes a vertically movable, reinforcing member gripping assembly, generally designated 180, supported on the carriage 176. The gripper assembly 180 includes a pivotal bar 182 which is journaled in upstanding plates 184, provided on the tubular cross bar 177, and mounts transverse support bars 186 having slightly upwardly inclined terminal end 186a (FIG. 5). Brackets 187 depend from the inclined terminal ends 186a and mount gripper mounting bars 188 and 189 supporting suction cups 190 on the underside thereof. A vacuum source 191 is mounted on the frame and includes vacuum hoses (not shown) communicating with the suction cups 190. The gripping assembly 180, inclduing the suction cups 190, is pivoted about the axis of the pivot bar 182 by a double acting, fluid operated, solenoid actuated cylinder 192, which is mounted atop the tubular carriage bar 177, and includes a piston rod 193 pivotally connected, by a pin 194, to an upstanding lever 195 fixed to the pivot bar 182. When the piston rod 193 is withdrawn, the gripping assembly 180 and the suction cups 190 are swung upwardly to the raised position illustrated in solid lines in FIG. 5. When the piston rod 193 is extended, the gripper assembly 180 and the suction cups 190 are swung to the lower position, such as is illustrated in FIG. 7.

Apparatus is provided for moving the gripper support carriage 176 in a to-and-fro path of travel between a position removed from the molds, illustrated in chain lines in FIG. 5, in which the reinforcing members 152 are gripped by the suction cups 190 and a forward, discharging position between the molds, illustrated in FIG. 7, and includes a fluid operated, solenoid actuated, double acting cylinder 196 having a piston rod 197 at each end thereof connected to a cable 198 which is also connected to a bracket 199 on the gripper support carriage 176. As the cylinder 196 is actuated and the pistons 197 move in opposite directions, the cables 198 are moved in a push-pull fashion to move the gripper support carriage 176 in a to-and-fro path of travel. The gripper support carriage 176 also mounts a pair of freely rotatable sprockets 200 engaging a pair of racks 201 on the side rail members 174 to guide the carriage 176 in its to-and-fro path.

THE ELECTRICAL CONTROL CIRCUIT

Referring now more particularly to FIGS. 13 and 13A, an electrical control circuit is illustrated for controlling the apparatus illustrated in FIGS. 1 – 7 and includes a pair of main input circuit lines L1 and L2 connected to a source of electrical power such as 110 volt, 60 cycle, alternating current. Connected between the lines L1 and L2 are a plurality of circuit and sub-circuit lines designated L4 – L42 for purposes of convenience. Connected in line L4 across lines L1 and L2 is a set of limit switch contacts LS–1a, of a frame mounted limit switch LS-1, which is tripped when either of the lower sheet supporting carriages 32 or 34 is centrally located at the forming station 10, and a cycle timer 1T including normally open timer contacts 1T1 (line L11), 1T2 (line L12), 1T3 (line L13), and 1T4 (line L16) which sequentially close after the time 1T is energized. A second air injection and molding control timer 2T (line L5) is connected in parallel with the timer 1T (line L4) and includes a set of timer contacts 2T1 (line L17) which close when the timer times out. Serially connected in line L6 is a heater control timer 3T and the normally open relay control contacts 5CR1, constituting a portion of an index right control relay 5CR (line L22), which close when the relay 5CR (line L22) is energized. Connected in parallel with line L6 is a line L7 including another heater control timer 4T connected in series relation with the normally open contacts 6CR1 constituting part of an index left control relay 6CR (line L24). A limit switch LS–2, mounted on the frame support plates 84 in the path of the lower platen 86, is tripped when the lower mold 96 is extended into engagement with the lower sheet S at the molding station 10 to close a set of normally open contacts LS–2a (line L8). Serially connected with the limit switch contacts LS–2a are a set of normally open contacts 5CR6, which close when the index right control relay 5CR (line L22) is energized, and a control timer 5T (line L1). The lines L9 and L10 are connected in parallel with the relay contacts 5CR6 and an "index right" control timer 5T. Serially connected in the line L9 are the normally open contacts 6CR6 which close when the "index left" control relay 6CR (line L24) is energized and an "index left" control timer 6T.

Serially connected in line L10 are the normally closed timer contacts 5T1 and 6T1 which open a predetermined time after the timers 5T and 6T, respectively, are energized, and the solenoid AH for interrupting the flow of fluid from one end of stop cylinder 89 to the other end of the stop cylinder 89.

Connected between the lines L1 and L2, in line L11, are the normally open timer contacts 1T1, the normally closed relay contacts 4CR1, which are opened with the control relay 4CR (line L3) is energized, and a solenoid A for directing air to the platen moving cylinders 92 for moving the upper and lower molds 96 together to the forming positions is energized.

Connected in series in line L12 across lines L1 and L2 are the normally open contacts 1T2 and a solenoid B for retracting the molds 96 to their removed positions permitting a part formed therein to be removed and additional sheets S to be clamped to the carriage. Connected in line L13 are the normally open timer contacts 1T3 and a control relay 4CR which includes a set of normally open contacts 4CR2 in line L14 connected in series with a set of normally open contacts 6CR2, which are closed when the relay 6CR (line L23) is energized, and the solenoid F which when energized actuates the directional control valve 112 to the cross-over position to index the carriages 30, 32, 34 and 36 to the positions illustrated in FIG. 1. Connected in line L15, in parallel with the contacts 6CR2 and the solenoid F, are the normally open contacts 5CR2, which are closed when the index right control relay 5CR (line L22) is energized, and the solenoid E which when energized actuates the directional control valve 112 to the flow through position, illustrated in FIG. 3, to index the upper carriages 30 and 32 to the right, as viewed in FIG. 1, and concurrently index the lower carriages 34 and 36 to the left as viewed in FIG. 1.

Connected in line L16 are the timer contacts 1T4 and the solenoid G for selectively communicating (when energized), the vacuum to the molds 96 when the molds 96 are brought into engagement with the sheets at the forming station 10 to form the upper and lower container halves which are subsequently brought into fusing engagement with each other. Connected in line L17 across lines L1 and L2 are the normally open contacts 2T1, which close a predetermined time after the timer 2T (line L8) is energized, and the ejection air control solenoid T which actuates valves for directing ejecting air against the parts in the molds 96 to remove the parts therefrom.

When articles are formed from laminated plastic sheets, i.e., sheets made up of two or more sheets of different material, opposite sides of the sheets must be subjected to different amounts of heat to bring the entire sheet to substantially the same forming temperature. The circuitry in lines L18 through L21 comprises the control circuitry for the heaters 22a and 28a at the right hand heating station 12a. Connected in line L18 across lines L1 and L2 is a set of timer contacts 3T1 which are closed a predetermined time after the timer 3T (line L9) is energized and a top right heater control relay R1 for energizing the heater 22a at the right heating station 12a. Connected in line L19, in parallel with the contacts 3T1, is a set of timer contacts 4T1 which are closed a predetermined time after the timer 4T (line L7) is energized. Connected in line L20 is a set of normally open timer contacts 3T2, which close a predetermined time after the timer contacts 3T1 close, and a bottom right heater control relay R2 which when energized actuates the bottom right hand heater 28a at the right hand heating station 12a a predetermined time after the upper right hand heater 22a is energized. A set of timer contacts 4T2 (line L21), which close a predetermined time after the timer 4T (line L10) is energized but before the timer contacts 4T1 (line L19) close, is connected in parallel with th contacts 3T2 in line L20.

An index right control relay 5CR, for controlling movement of the upper carriages to the right, is connected in line L22 with the normally open limit switch contacts LS-5a which close when the upper carriage 32 is at the forming station 10 as illustrated in FIG. 1. Connected in line L23 in parallel with the switch LS-5a (line L22), are the normally open contacts 5CR3, which close when the relay 5CR (line L22) is energized, and the normally closed contacts 6CR3, which are opened when the index left contact relay 6CR (line L24) is energized. Also connected in line L24 is a set of limit switch contacts LS-6a which is closed when the frame supported limit switch LS-6 is actuated by the carriage 32 at the forming station 10. The limit switch contacts LS-6a are connected in series with a relay 6CR which, when actuated, closes the normally open contacts 6CR1 (line L7) 6CR2 (line L14), 6CR4 (line L25), 6CR5 (line L27) and 6CR6 (line L4) and the normally closed contacts 6CR3 (line L23). Connected in line L25, in parallel with the limit switch contacts LS-6a, are the normally closed contacts 5CR4, which open when the index right control relay 5CR (line L22) is energized and the normally open contacts 6CR4 which are closed when the index left control relay 6CR in line L24 is energized. Connected in line L26 is a set of normally open limit switch contacts LS-7a, which are closed when the limit switch LS-7 is actuated by the upper sheet supporting carriage 32 approaching the forming station 10 and the normally open contacts 5CR5 which are closed when the index right control relay 5CR (line L22) is energized, and a parallel circuit including a pair of solenoids M which control the positions of deceleration valves 120 and 120a to selectively block the passage of air to and from the cylinder 80 and cause the piston 78 to decelerate the carriages during the final portion of their travel between stations by forcing the air to pass through the circuit paths 118 and 118a.

Connected in line L27, in parallel with the limit switch contacts LS-7a and relay contacts 5CR5, are the normally open limit switch contacts LS-8a and the normally open relay contacts 6CR5 which close when index left control relay 6CR (line L24) is energized. The limit switch LS-8 is actuated to close the contacts LS-8a as the carriage 36 approaches the forming station 10.

The circuitry connected in the lines L28 – L31 comprises control circuitry for the heaters at the left hand heating station 12. Connected in line L28 are the normally open timer contacts 3T3 which close a predetermined time after the timer 3T (line L9) is energized and after the timer contacts 3T1 (line L18) and 3T2 (line L20) close, and a top left heater control relay R3 which, when energized, actuates the upper quartz heaters 22 in the left heating station 12. Connected in parallel with the timer contacts 3T3 are a set of normally open, timer contacts 4T3 (line L29) which close a predetermined time after the timer 4T (line L7) is energized but before the timer contacts 4T2 (line L21). Connected in line L30 is a set of timer contacts 3T4 which close a predetermined time after the timer 3T (line L9) is energized but before the contacts 3T3 (line L28) close, and a bottom left heater control relay R4 which, when energized, energizes the lower left hand heater 28. Connected in parallel with the timer contacts 3T4 are the normally open timer contacts 4T4 which close a predetermined time after the timer 4T (line L10) is energized and a predetermined time after the contacts 4T3 close but before the contacts 4T1 (line L19) close.

The timer 3T thus operates to energize the top right heater 22a before the lower right heater 28a which is energized before the top left heater and energizes the top left heater after the lower left heater is energized when the carriages 30, 32, 34 and 36 are positioned as illustrated in FIG. 1. When the positions of the sheet supporting carriages are reversed, the timer 4T operates to energize the top left heater 22 before the lower left heater 28 which is energized before the top right heater 22a and operates the lower right heater 28a for a longer duration than the top right heater 28a for a longer duration than the top right heater 22a.

Referring now to FIG. 13A line L32 includes a gripper member supply carriage control timer 7T connected in series with the normally open limit switch contacts LS-2b which close when the frame supported limit switch LS-2 is tripped by the upper and lower molds 96 moving to a molding position in engagement with a pair of upper and lower sheets S at the forming station 10. The timer 7T includes normally closed contacts 7T1 (line L33) and 7T4 (line L36) and normally open contacts 7T2 (line L34) and 7T3 (line L35) which open and close respectively as the timer 7T times out.

The normally closed timer contacts 7T1 are connected in line L33 in series with a gripper carriage return solenoid 196a which, when energized, directs fluid to the cylinder 196 in such a manner as to return the gripper carriage 176 to the laterally retracted position illustrated in FIG. 8.

The normally open timer contacts 7T2 are connected in line L34 in series with the gripper carriage forwarding solenoid 196b which, when energized, directs fluid to the cylinder 196 in such a manner as to move the gripper carriage 176 laterally forwardly to the position between the molds 96, illustrated in FIG. 7.

The normally open timer contacts 7T3 (line L35) are connected in series with the reinforcing member supply carriage retract solenoid 166b which, when energized, directs fluid to the cylinder 166 in such a manner as to retract the reinforcing member supply carriage 160 to the retracted supply position (FIG. 5) for receiving an additional supply of reinforcing member 152.

The normally closed timer contacts 7T4 (line L36) are connected in series with the reinforcing member supply carriage forwarding solenoid 166a which, when energized, directs fluid to the cylinder 166 in such a manner as to drive the supply carriage 160 forwardly to the discharge position illustrated in chain lines in FIG. 5.

Connected across lines L1 and L2 in line L37 is the gripper raise and lowering control timer 8T connected in series with the normally open limit switch contacts LS–10a of a limit switch LS–10 (FIG. 5) which is tripped by the gripper support carriage 176 moving toward its forward position. The timer 8T includes normally open contacts 8T1 (line L39) and normally closed contacts 8T2 (line L40) which are alternately and oppositely closed and open. Connected across lines L1 and L2 in line L38 is another gripper raise and lower control timer 9T, including normally open contacts 9T1 connected in parallel with the contacts 8T1 and normally closed contacts 9T2 connected in series with the contacts 8T2 (line L40). The contacts 9T1 and 9T2 are alternately and oppositely closed and opened in a manner which will be more particularly described hereinafter.

Connected in series with the timer contacts 8T1 (line L39) is a gripper lowering solenoid 192a which directs fluid to the cylinder 192 in such a manner as to swing the grippers 190 to the lower position, illustrated in solid lines in FIG. 7 and chain lines in FIG. 5, to release or grip reinforcing members 152. The contacts 8T2 and 9T2 (line L40) are connected in series with the gripper raising solenoid 192b which, when energized, directs fluid to the cylinder 192 in such a manner as to swing the lever 195 and the gripper assembly 180 upwardly from the lowered position, illustrated in solid lines in FIG. 7, to the raised position illustrated in chain lines in FIG. 7.

Connected in line L41 is a set of normally open limit switch contacts LS–10b which close when the gripper support carriage 176 is moved forwardly to trip the limit switch LS–10, the normally open limit switch contacts LS–12a, which close when a limit switch LS–12 (FIG. 8) is tripped by the gripper frame members 189 swinging downwardly to the releasing position, and a solenoid 191a which interrupts the supply of vacuum to the cups 190 to deposit a reinforcing member 152 on the lower sheet S as at the forming station 10. The timers 1T, 2T, 3T, 4T, 5T, 6T, 7T, 8T and 9T are multiple station settable, linear timers of the type manufactured by Eagle Manufacturing Company, as Model No. HM5-05-A6-02-06 and include separately energized clutches (not shown) as usual.

THE OPERATION

It is assumed that the platens 86 are initially retracted and that the upper and lower sheet supporting carriages 32 and 34 carry laminated sheets S of synthetic plastic, thermoplastic material, which have been preheated to the desired forming temperature at the heating stations 12 and 12a and have just been moved to the positions illustrated in FIG. 1 to actuate the limit switches LS–1, LS–5 and LS–7. The gripper carriage 176 will be in its retracted position with the grippers 190 in the raised position gripping a plurality of reinforcing inserts 152. The sheets S carried by the top carriages 30 and 32 are thinner than the sheets S carried by the lower carriages 34 and 36. When the limit switch LS–1 is actuated, the contacts LS–1a (line L5) close and the timer 1T (line L7) is energized. A predetermined time after the timer 1T is energized, the timer contacts 1T1 (line L11) close to energize mold advance solenoid A for directing air to the mold advancing cylinders 92 so as to extend the pistons 94 and the toggle links 97 and 98. After the molds 96 are moved into engagement with the upper and lower sheets S on the carriages 32 and 34, the limit switch LS–2 is actuated by the lower platen 86 to close the contacts LS–2a (line L8) and energize the platen locking solenoid AH (line L10) to temporarily halt the lower platen 86 in position. The timer contacts 1T4 (line L16) then close to actuate the vacuum control solenoid G (line L16) to create a vacuum in the molds and form shapes in the upper and lower sheets.

When the limit switch LS–2 is tripped, the contacts LS–2b (line L32) also close to energize the timer 7T, to open the normally closed contacts 7T1 (line L33) and close the normally open contacts 7T2 (line L34). When the contacts 7T2 close, he solenoid 196b is energized and the gripper carriage 176 is advanced to forwardly move the suction cups 190 carrying the reinforcing members 152 to the position between the molds 96 illustrated in chain lines in FIG. 7. As the gripper carriage 176 moves forwardly, the limit switch LS–10 is tripped to close the normally open limit switch contacts LS–10a (line L37) and energize the timer 8T which closes the contacts 8T1 (line L39) and opens the contacts 8T2 (line L40) to energize the gripper assembly lowering solenoid 192a. This directs fluid to the cylinder 192 in such a manner as to swing the gripper assembly 180 downwardly to the lower position illustrated in solid lines in FIG. 7. When the limit switch LS–10 is tripped, the contacts LS–10b (line L41) also close and when the gripper assembly 180 is lowered, the limit switch LS–12 is tripped to close the contacts LS–12a (line L41) and energize the vacuum interrupting solenoid 191a so that the reinforcing members 152 are released from the gripping members 190. The timer 8T is set so that after the reinfocing members are released, the contacts 8T1 (line L39) and 8T2 (line L40) again open and close respectively to energize the gripper raise solenoid 192b (line 140) to return the gripping assembly 180 to the raised position. The timer 7T is set so that the contacts 7T1 (line L33) and 7T2 (line L34) are again closed and opened respectively to energize the carriage gripper return solenoid 196a to return the gripper carriage 176 to its retracted position.

When the timer 7T is initially energized, the normally open contacts 7T3 (line L35) and normally closed contacts 7T4 (line L36) also close and open respectively to energize the supply carriage retract solenoid 166b to retract the reinforcing member supply carriage 160 to the supply position so that a new supply of reinforcing members 152 can be deposited on the carriage 160 when the gripper cups 190 are releasing the orginal supply of reinforcing members at the forming station 10.

When the gripper members 190 are again swung to the raised position, the normally open contacts 7T3 (line L35) and normally closed contacts 7T4 (line L36) are again opened and closed respectively to energize the supply carriage forwarding solenoid 166a to drive the reinforcing member supply carriage 160 forwardly to the position underlying the grippers 190, illustrated in chain lines in FIG. 5. With the suction cup support carriage 176 in the retracted position, the limit switch LS-11 is tripped to close the limit switch contacts LS-11a (line L38) and energize the timer 9T. When the timer 9T is energized, the contacts 9T1 (line L39) close and the contacts 9T2 (line L40) open to again energize the gripper lowering solenoid 192a to lower the suction cups 190 to the position illustrated in chain lines in FIG. 5, gripping the new supply of reinforcing members 152. The timer 9T is set to time out so that the contacts 9T1 again open, and the contacts 9T2 again close to energize the gripper raise solenoid 192b to swing the suction cups 190 to the raised position, ready to move forwardly when the sheets on the upper carriage 30 and lower carriage 36 are superposed at the forming station. After the shapes are formed, air is directed to the clamp control cylinders 52 on the lower sheet supporting carriage 34 so as to swing the clamps 46 to the unclamped position, illustrated in chain lines in FIG. 4, and release the lower sheet S on the carriage 34 so that it can be moved upwardly with the lower mold 96.

When the limit switch LS-5 is actuated, the contacts LS-5a (line L22) close to energize the control relay 5CR (line L22) and close the normally open contacts 5CR6 (line L8) which energizes the timer 5T (line L8) when the lower mold has moved upwardly to sufficient distance to actuate the limit switch LS-2 and close the contacts LS-2a (line L8). After a short delay time, i.e., 5 seconds, the timer contacts 5T1 (line L10) open to denergize the lower platen locking solenoid AH which operates the lower platen halting valve V to permit the lower platen to continue to be raised upwardly and move the lower sheet S into engagement with the upper sheet S so as to press the upper and lower sheets S together to fuse the shapes into a hollow structure. The wooden reinforcing members 152 are sandwiched between the upper and lower sheets S which are bonded to opposite sides thereof to form the reinforced window shutter SH illustrated in FIGS. 10 - 12. The bonded sheets S and members 152 coact in resisting external force. When the part is formed, the timer contacts 1T2 (line L12) close and timer contacts 1T1 (line L11) open to move the molds 96 apart so that the formed part can be removed.

Concurrently with the formation of the hollow object at the forming station 10, the sheets on the upper and lower carriages 30 and 36 are being heated at the heating stations 12 and 12a, respectively. A predetermined time after the relay 5CR (line L22) is energized the contacts 5CR1 (line L6) close to energize the heater control timer 3T. A short time after heater control timer 3T is energized, the timer contacts 3T1 (line L18) close to energize the top right heater control relay R1 for energizing the top heater 22a at the right hand heating station 12a. A predetermined time thereafter, the timer contacts 3T2 (line L20) close to energize the bottom right heater control relay R2 for energizing the bottom right heater 28a. A predetermined time, depending on the thickness of the upper sheet on the carriage 30, after the timer contacts 3T1 close, the timer contacts 3T4 (line L30) close to energize the bottom left heater control relay R4 for energizing the lower heater at the left heating station 12 to apply heat to the bottom side of the sheet S on the carriage 30 for a lesser time than heat is applied to the upper side of the sheet S at heating station 12a. A predetermined time after the timer contacts 3T4 close and after the contacts 3T2 (line L20) close the timer contacts 3T3 (line L28) close to energize the top left heater control relay R3 which energizes the top left heater 22. When the carriages 30, 32, 34 and 36 are in the positions illustrated in the drawing, the heater 22a will be operated for a longer period of time than any of the remaining heaters 28a, 22, or 28 and the heater 22 will be operated for a shorter time than any of the heaters 28, 22a and 28a. After a predetermined time, the timer 3R times out and resets to simultaneously deenergize the heater control relays R1 - R4 and the heaters 22, 22a, 28 and 28a at both heating stations. After the relays R1 - R4 are deenergized, the contacts 1T1 (line L11) open and the contacts 1T2 (line L12) close to energize the mold retract solenoid B for retracting the molds 96 to their removed positions. When the molds 96 spread, the clamps 46 on the upper carriage 32 are released and the contacts 2T1 (line L17) close to energize the air eject solenoid I for directing ejection air into the molds 96 to eject the parts therefrom, which may be manually removed to a remote location.

After the molds 96 have moved to spread positions, the timer contacts 1T3 (line L13) close to energize the carriage indexing control relay 4CR which closes a set of contacts 4CR2 (line L14) to energize the carriage advance solenoid E (line L15) through the contacts 5CR2 (line L15) which close when the relay 5CR (line L22) is energized by the closure of limit switch contacts LS-5a as the carriage 32 reached the forming station. When the solenoid E is energized, the fluid directional control valve 112 (FIG. 3) is moved to the cross-over position to direct fluid through the fluid line 116a (FIG. 3) and the check valve 123a to the opposite end of the carriage indexing cylinder 78.

Fluid from the other end of the cylinder 80 passes freely through the variable orifice 124 of the valve 120 and the line 116 to the reservoir. The carriage indexing piston 78 moves toward the right to drive the chains 76 which turns the sprocket sheets 67 and 68 to drive the carriage driving chains 66 and move the upper carriages 30 and 32 to the right and the lower carriages 34 and 36 to the left until the upper carriage 30 and lower carriage 36 are in superposed relation at the forming station 10.

During the initial portion of the travel from the position illustrated in FIG. 1 to the position in which the carriage 30 is at the forming station 10, the fluid flows freely to and from the cylinder A through lines 116a and 116. When the cylinder approaches the end of its path, the limit switch LS-8 is energized to close the contacts LS-8a in line L27. The limit switch LS-6 is also in the path of the carriage 36 and is actuated as the carriage 36 reaches the forming station 10 to close the contacts LS–6a (line L25) to energize the relay 6CR (line L24) and close the contacts 6CR5 (line L27) to energize the fluid control valve solenoid M (line L26) which moves the valve 120 and 120a to the blocking positions to prevent fluid from flowing through the lines 116 and 116a and force the fluid through the lines 118 and 118a. The fluid through the lines 118 and 118a is restricted to decelerate the pistons 78 during the final portions of their strokes. The lower carriage 36 arriving at the forming station 1 will actuate the limit switch LS–1 and maintain the limit switches LS–6 actuated.

When the limit switch LS–1 is actuated, the limit switch contacts LS–1a (line L5) again close to operate timers 1T and 2T as described hereinbefore. When the limit switch LS–6 is actuated, contacts LS–6a (line L23) close to energize the index left control relay 6CR which closes the contacts 6CR1 in line L10 to energize the heater control timer 4T. Energization of the timers 1T and 2T operates the upper and lower molds 96 and 98 to form another part in the sheets as described hereinbefore. A predetermined time after the timer 4T is energized, the timer contacts 4T3 and 4T4 (line L29 and L31) successively close to successively energize the top and bottom heater control relays R3 and R4 which successively operate the left hand heaters 22 and 28. A predetermined time after the actuation of the timer contacts 4T3 close, the contacts 4T2 and 4T1 (lines L21 and L19) successively close to successively energize the right hand heater control relays R1 and R2 which successively energize the heater control relays 22a and 28a. In this instance, the heaters 22a and 28a need not be operated as long as the heaters 22 and 28 are operated since a thinner sheet is at the station 12a. The heater 22 will be operated for a longer period of time than any of the remaining heaters 28, 22a and 28a are operated, and the heater 22a will be operated for a shorter period of time than the heaters 28a, 22 and 28 are operated. When the timer controls 1T2 and 1T3 (lines L12 and L13) close, the molds are again retracted and the operation is repeated.

THE PLUG ASSIST APPARATUS

Referring now more particularly to FIGS. 14 – 16, the apparatus is generally identical to that previously described except that the lower mold 96 includes a plurality of relatively deep mold cavities C′ having vacuum ports p′ communicating with a vacuum source, as usual. The suction cup members 190 are replaced by a like plurality of plug assist members 190a which are mounted on the mounting bars 189 for vertical movement therewith into the mold cavities C′ to assist movement of a portion of the lower plastic sheet S into the lower mold cavities C. The plug assist members 190a are not perpendicular to the mounting bars 189, but are offset so that the male plug assist members 190 will move in more nearly vertical paths of travel into the cavities C′ as the mounting bars 189 are swung in arcuate paths of travel between the raised positions, illustrated in FIG. 14, and the lowered positions, illustrated in FIG. 16. The control circuit for operating the apparatus illustrated in FIGS. 14 – 16 is identical to the control circuit illustrated in FIGS. 13 and 13a except that circuit lines 35, 36, and 41 are eliminated.

The operation of the control circuit differs slightly from the operation previously described in that the forming timer 1T (line L4) is adjusted such that the timer contacts 1T4 (line L16) do not close to actuate the vacuum control solenoid G (line L16) to provide a vacuum in the mold cavities C and C′ until after the gripper carriage 176 is advanced forwardly to move the plug assists 190a to the positions between the molds 96, and the plug assist members 190a have been lowered to deform a portion of the lower heated plastic sheet S as the plug assists 190 commence to enter the cavities C, as illustrated in FIG. 15. In the construction illustrated in FIGS. 14 – 16, the timer 1T is set to time out such that the timer contacts 1T4 close after the contacts 8T1 (line L39) and contacts 8T2 (line L40) close and open respectively, to energize the lower solenoid 192a. The remainder of the operation is substantially as described heretofore.

DEEP DRAW AND PLUG ASSIST APPARATUS

Referring now more particularly to FIG. 17, the apparatus is generally identical to the apparatus illustrated in FIGS. 1 – 4 except that the plug assist apparatus, including the plug assist carriage 189, illustrated in FIGS. 14 – 16, is disposed at the left side of the molds 96, as viewed in FIG. 17, and the apparatus for inserting relatively thicker reinforcing members 152′, including the reinforcing member carriage 176 illustrated in FIG. 5, is oppositely disposed at the right side of the molds 96, as viewed in FIG. 17. The plug assist carriage 189 and the reinforcing member carriage 153 are successively operated to successively move the plug assist members 190a and suction cup members 190 to positions between the molds 96. The lower mold includes deep draw cavities C′ whereas the top mold 96 includes relatively shallow cavities C aligned therewith.

The circuit for operating the appatatus illustrated in FIG. 17 is identical to that disclosed in FIGS. 13 and 13A with the addition of control circuitry (not shown) for operating the plug assist apparatus which is identical to that disclosed in circuit lines L32 – L34 and lines L37 – L40. Also, the forming timer 1T (line L4) is adjusted such that the timer contacts 1T4 (line L16) do not close to actuate the vacuum control solenoid G (line L16) to provide a vacuum in the upper and lower mold cavities C and C′ until after the plug assist members 190a have been moved to the positions illustrated in FIG. 19. Also, the timer 7T (line L32) will be set so that the contact 7T1 (line L33) and 7T2 (line L34) open and close, respectively, only after the male plug assist members 190a have been removed from the position between the molds (FIG. 20). The remainder of the control circuit is identical to that previously described with relation to the operation of FIGS. 1 – 7.

The operation of the apparatus illustrated in FIG. 17 prior to retraction of the reinforcing member support carriage 153 differs from the operation of the apparatus illustrated in FIGS. 1 – 7 and can best be described with reference to FIGS. 18 – 28. The plug assist carriage 189 is firstly moved to a position between the molds 96 (FIG. 18) and then swung downwardly to the position illustrated in FIG. 19. At this time, vacuum is communicated to the cavities C and C′ as the plug assist members continue to swing downwardly to form a portion of the sheet of the shape of the cavity C′ (FIG. 20). The plug assist members 190a are then withdrawn and retracted to the position illustrated in FIG. 21.

The opposite reinforcing member carriage 176 and the suction cup members 190 carrying the reinforcing members 152 is then moved to a position between the molds 96 (FIG. 25) and then lowered to deposit the reinforcing members into the deep drawn shapes formed in the cavities C'.

REINFORCING MEMBER PLUG ASSIST APPARATUS

Referring now more particularly to FIGS. 25 – 29, apparatus substantially identical to that illustrated in FIGS. 1 – 7 is provided but differs therefrom in that the upper and lower molds 96 each have deep draw cavities C' communicating with the vacuum source D via ports p. The circuit for operating the apparatus illustrated in FIGS. 25 – 29 is identical to that illustrated in FIGS. 13 and 13A, except that an additional circuit line L16A, illustrated in phantom in FIG. 13 is provided and includes a set of timer contacts 1T4' and a vacuum control solenoid G' for separately controlling the communication of vacuum to the upper mold cavities. The circuit line L16 only controls the communication of the vacuum to the lower cavities C'. Also, the forming timer 1T (line L4) is adjusted such that the timer contacts 1T4 (line L16) do not close to actuate the vacuum control solenoid G (line L16) to provide a vacuum in the lower mold cavities C' until after the gripper carriage 176 is advanced forwardly and lowered to move relatively thick reinforcing members 152' partially into the lower cavity C. When the lower sheet S is moved to the position illustrated in FIG. 26, the timer 1T times out so that the timer contacts 1T4 close to energize the vacuum control solenoid G and cause the portion of the sheet in the cavity to be drawn toward the wall of the cavities C'. The reinforcing members 152' continue to move downwardly to aid the vacuum in moving the portion of the sheet intimately against the cavity wall as is illustrated in FIG. 27.

After the carriage 176 is withdrawn the timer contacts 1T1 (line L11) close to move the molds together. The reinforcing members 152' will function as plug assist members and will aid in moving portions of the sheets into the upper cavities C'. The timer 1T is set so that the contacts 1T4 (line L16A) close to energize the upper vacuum control solenoid G' when the molds 96 reach the positions illustrated in FIG. 28. The vacuum and reinforcing members 152' thus both aid in forcing the sheet into intimate engagement with the upper cavities C'. When the hot sheets S are brought against the reinforcing members 152', a very good bond is achieved. The reinforcing members 152' may be coated with adhesive, if desired, to improve the bond.

It is to be understood that the drawings and descriptive matter are in all cases to be interpreted as merely illustrative of the principles of the invention rather than as limiting the same in any way since it is contemplated that various changes may be made in various elements to achieve like results without departing from the spirit of the invention or the scope of the appended claims.

What is claimed is:

1. Apparatus for forming a hollow article from sheets of deformable thermoplastic material comprising:
   frame means with a forming station and a sheet heating station;
   sheet heating means at said sheet heating station for heating sheets of deformable thermoplastic material;
   carriage means on said frame supporting a pair of sheets of thermoplastic material for movement from said sheet heating station to said forming station;
   mold assembly means at said forming station including a differential pressure mold member having a mold cavity for forming a shape in at least one of said sheets and an opposed member at least one of said members being mounted on said frame for movement toward and away from the other between a removed position and a sheet engaging position, and means for applying a differential pressure to opposite sides of said one sheet when said differential pressure mold member is in said sheet engaging position;
   carrier means for moving article reinforcing means to a position between said members when said one member is in said removed position and depositing it on said one sheet;
   means for moving said one member toward the other member to fuse said sheets together and sandwich said reinforcing means between said sheets; and
   means for separating said members.

2. The apparatus set forth in claim 1 wherein said carrier means for moving and depositing said article reinforcing means comprises
   a carrier movable in a to-and-fro path of travel between a discharge position between said members and a removed position;
   gripper means on said carrier for gripping said reinforcing means when said carrier is in said removed position and for releasing said reinforcing member on said one sheet between said members when said carrier is in said discharge position.

3. The apparatus set forth in claim 2 wherein said carrier is movable in a horizontal path of travel, said gripper means being mounted on said carrier for vertical movement between raised and lowered positions, and means is provided for moving said gripper means from said raised position to said lowered position when said carrier is in said discharge position to deposit said reinforcing means on said one sheet.

4. The apparatus set forth in claim 3 including supply means for supporting reinforcing means to be gripped by said gripper means; and means is provided for moving said gripper means between said raised position and said lowered position to grip said reinforcing means on said supply means when said carriage means is in said removed position.

5. The apparatus set forth in claim 4 wherein said supply means includes support means movable between a position underlying said gripper means when said carriage means is in said removed position, and an offset position for receiving reinforcing means, and control means is provided for coordinating the movement of said supply means, said carrier means, said sheet supporting carriage means, and said member moving means.

6. The apparatus set forth in claim 2 wherein said gripper means is mounted on said carrier for swinging movement between raised and lowered positions; and means is provided for swinging said gripper means between lowered positions when said carrier is in said removed position and said discharge position for picking up and discharging reinforcing means, respectively, and a raised position when said carrier is moving between said removed and discharge positions.

7. The apparatus set forth in claim 6 wherein said gripper means comprises a plurality of suction means.

8. The apparatus set forth in claim 1 wherein said means for moving said reinforcing means moves in a path of travel transverse to the path of travel of said sheets between said heating station and said forming station.

9. The apparatus set forth in claim 1 wherein said sheet heating means comprises a pair of plastic sheets heaters on opposite sides of said forming station at which sheets of deformable thermoplastic material are concurrently heated; said carriage means comprises upper and lower carriers for supporting upper and lower sheets of thermoplastic material; said upper and lower carriers being mounted for movement between positions at said sheet heating stations and confronting positions at said forming station.

10. Apparatus for forming a hollow object from a pair of thermoplastic sheets comprising: a frame, a pair of mold members having generally flat opposed surfaces mounted on said frame for movement wherein at least one of said members is movable toward and away from the other between an open position wherein said surfaces are in spaced substantially parallel relationship with each other and a closed position wherein said members clamp a pair of thermoplastic sheets between said opposed surfaces, one of said mold members having a cavity extending inwardly of the member from its generally flat surface, first means operable when said mold members are in said open position for locating a pair of sheets of thermoplastic material respectively adjacent the opposed surfaces of said mold members, cavity entering means including a carrier and a cavity entering member mounted on said carrier, second means operable when said mold members are in said open position for advancing said cavity entering means from a retracted position outside the space between said mold members to an extended position wherein said cavity entering means is located between said mold members in operative alignment with said cavity in said one of said mold members and for subsequently projecting said entering means from said extended position to a projected position wherein said entering member projects into said cavity in engagement with the thermoplastic sheet located on the flat surface of said one of said mold members, differential pressure means operable to form the thermoplastic sheet to the shape of said cavity, said second means being operable subsequent to the operation of said differential pressure means to return said carrier to its retracted position, and third means operable upon the return of said carrier means to its retracted position for driving said mold members to their closed position to clamping fuse-bond said sheets to each other.

11. Apparatus as defined in claim 10 further comprising means detachably mounting said cavity entering member upon said carrier, control means operable when said cavity entering means is in said projected position for detaching said cavity entering member from said carrier to deposit said cavity entering member in said cavity for enclosure between said thermoplastic sheets.

12. Apparatus as defined in claim 11 wherein said differential pressure means is operated to conform said one sheet to said cavity prior to movement of said cavity entering means to said projected position.

13. Apparatus as defined in claim 10 wherein said cavity entering means is moved to said projected position to deform said one sheet into said cavity prior to operation of said differential pressure means.

14. Apparatus as defined in claim 13 wherein said cavity entering means comprises a carrier, a cavity entering member detachably mounted upon said carrier, control means operable when said cavity entering means is in said projected position for detaching said cavity entering member from said carrier to deposit said cavity entering member in said cavity for enclosure between said thermoplastic sheets.

* * * * *

UNITED STATES PATENT OFFICE
CERTIFICATE OF CORRECTION

Patent No.  3,867,088                    Dated   February 18, 1975

Inventor(s)  Gaylord W. Brown; George L. Pickard

It is certified that error appears in the above-identified patent and that said Letters Patent are hereby corrected as shown below:

Column 2, line 60, change "7" to --17--.

Column 4, line 5, change "62a" to --64a--.

Column 4, line 43, change "supoorted"to --supported--.

Column 7, line 11, change "end" to --ends--.

Column 7, line 28, change "lower" to --lowered--.

Column 7, line 65, change "time" to --timer--.

Column 7, line 18, change "lduing" to --luding--.

Column 9, line 5, change "ejecting" to --ejection--.

Column 9, line 19, after "right" insert --hand--.

Column 9, line 34, change "th" to --the--.

Column 11, line 30, change "open" to --opened--.

Column 11, line 43, change "lower" to --lowered--.

Column 12, line 35, change "th" to --the--.

Column 12, line 48, change "lower" to --lowered--.

Column 12, line 55, change "reinfocing" to --reinforcing--.

UNITED STATES PATENT OFFICE
CERTIFICATE OF CORRECTION

Patent No. 3,867,088              Dated  February 18, 1975

Inventor(s)  Gaylord W. Brown; George L. Pickard

It is certified that error appears in the above-identified patent and that said Letters Patent are hereby corrected as shown below:

Column 12, line 58, change "140" to --L40--.

Column 13, line 40, change "to" to --a--.

Column 14, line 23, change "3R" to --3T--.

Column 15, line 4, change "valve" to --valves--.

Column 19, line 7, change "sheets" to --sheet--.

Column 20, line 13, change "clamping" to --clampingly--.

Signed and sealed this 24th day of June 1975.

(SEAL)
Attest:

RUTH C. MASON
Attesting Officer

C. MARSHALL DANN
Commissioner of Patents
and Trademarks